No. 784,028. PATENTED MAR. 7, 1905.
L. BORSUM.
PHOTOGRAPHIC CAMERA.
APPLICATION FILED NOV. 13, 1903.
2 SHEETS—SHEET 1.
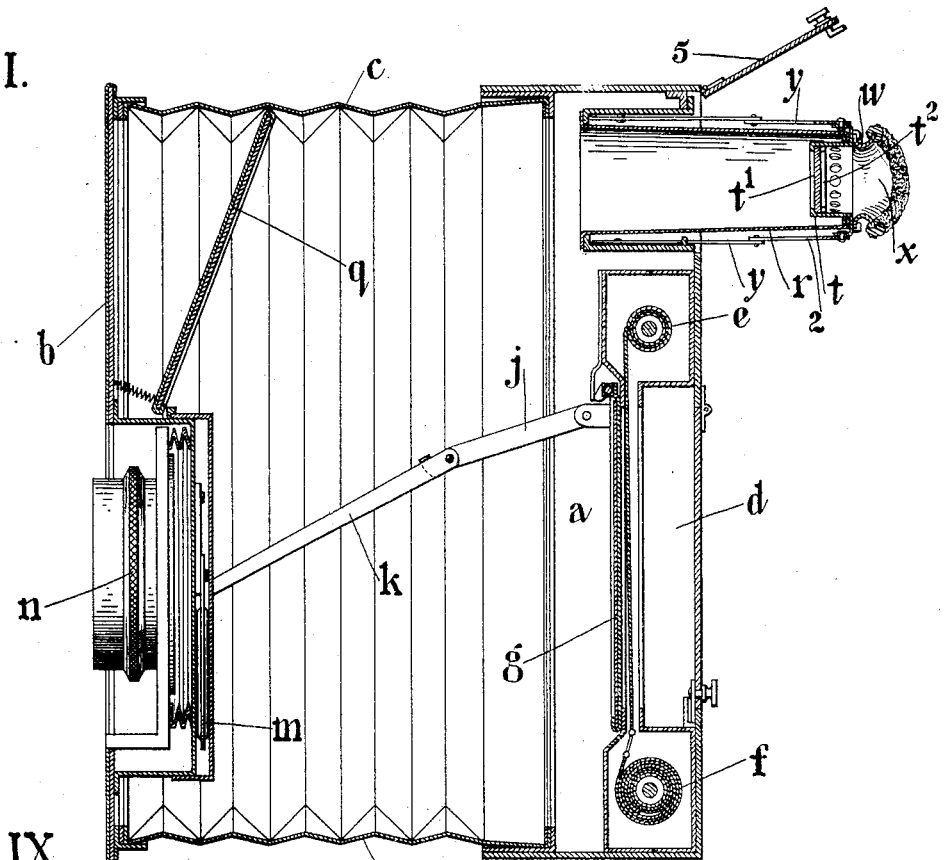
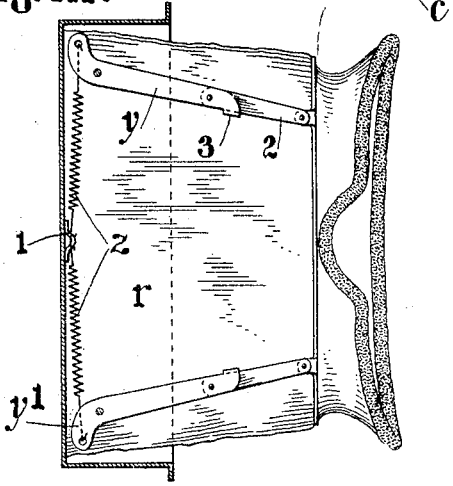
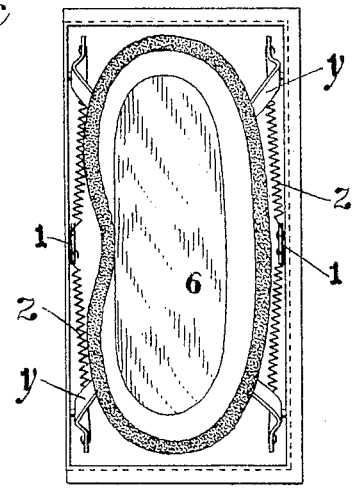
WITNESSES:
INVENTOR
Louis Borsum
BY
Baldwin, Davidson & Wight
ATTORNEYS No. 784,028. PATENTED MAR. 7, 1905.
L. BORSUM.
PHOTOGRAPHIC CAMERA.
APPLICATION FILED NOV. 13, 1903.
2 SHEETS—SHEET 2.
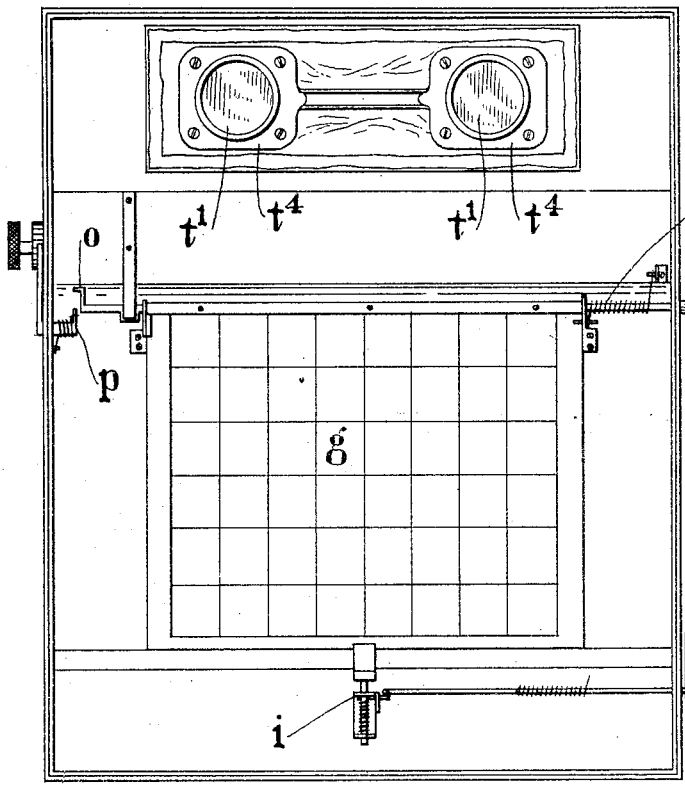
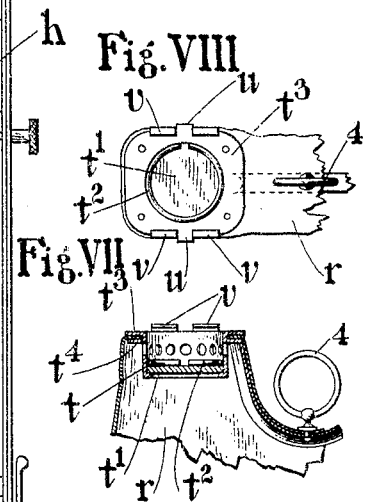
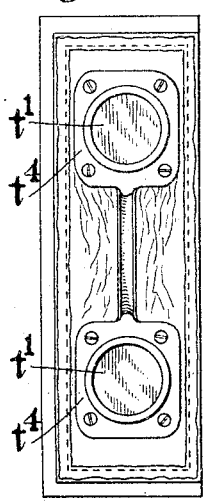
WITNESSES:
Lindsley Schepmoes
Lillie L. Browning
INVENTOR
Louis Borsum
BY
Baldwin, Davidson & Wight
ATTORNEYS No. 784,028.

Patented March 7, 1905.

UNITED STATES PATENT OFFICE.

LOUIS BORSUM, OF PLAINFIELD, NEW JERSEY.

PHOTOGRAPHIC CAMERA.

SPECIFICATION forming part of Letters Patent No. 784,028, dated March 7, 1905.

Application filed November 13, 1903. Serial No. 181,050.

*To all whom it may concern:*

Be it known that I, LOUIS BORSUM, a citizen of the United States, residing at Plainfield, county of Union, State of New Jersey, have invented new and useful Improvements in Photographic Cameras, of which the following is a specification.

This invention relates to cameras of the class in which the image formed by the lens is focused upon a surface within the camera casing or box and observed by the operator through observation-apertures by the aid of a mirror. Such a camera is described in my Patents No. 720,217, dated February 10, 1903, and No. 741,102, dated October 13, 1903.

The invention consists in an arrangement and construction, hereinafter described, of the means for observation of the focused image.

In the accompanying drawings, Figure 1 is a longitudinal vertical section through a camera embodying the invention; Fig. 2, a transverse section; Fig. 3, a detail view in elevation looking at the rear of the collapsible observation devices; Fig. 4, a detail side elevation thereof with their containing box or receptacle in section, showing the collapsible observation devices extended for use; Fig. 5, a similar view showing the devices collapsed; Fig. 6, a front view thereof; Fig. 7, a detail section of one side of the collapsible devices with the eyepiece carrying the glass removed; Fig. 8, a front elevation thereof. Fig. 9 shows a modified form of such collapsible devices in extended position, and Fig. 10 is a front elevation thereof.

The style of camera illustrated is that disclosed in my patents above mentioned. It comprises a rear member $a$, a front member $b$, and connecting-bellows $c$, which permits extension and collapsing. The rear member has the plate-holding chamber $d$, upper and lower shutter-rolls $e$ $f$, and a hinged plate $g$, upon which the image is focused. A spring $h$ tends normally to throw the plate up, and it is normally held down by a latch $i$. When the latch is tripped, the plate rises and by means of the links $j$ $k$ adjusts or moves a secondary lens $m$ to change the focus of the objective $n$ so that the image focused on the surface of plate $g$ will also be focused on the sensitive plate in the holder in rear of the focal-plane shutter. Finally, as the plate reaches its elevated position a projection $o$ on the rock-shaft thereof actuates the shutter-pawl $p$ and the shutter is tripped. The image focused on the surface of $g$ is reflected in a mirror $q$ and may be viewed through observation-apertures in the rear wall of the camera above the shutter. This construction is all fully disclosed in my prior patents. The present invention relates to the arrangement and construction of the observation devices through which is viewed the focused image reflected in the mirror.

Above the chamber containing the upper shutter-roll $e$ is a chamber or countersink in the rear camera-wall. Around its inner open end or to the edge thereof is attached the inner edge of a flexible collapsible hood or bellows $r$, to the outer part of which are applied separate eyepieces, as in Figs. 3 to 8, or a single screen or eyepiece for both eyes, as in Figs. 9 and 10. In Figs. 3 to 6 the outer part of the bellows is branched or has two tubular extensions $s$, in the open ends of which are secured flanged glass-holders, in the inwardly-projecting tubular parts $t$ of which are seated the eyeglasses $t'$, secured by a ring-spring $t^2$. The edge of the flexible part $s$ is secured between the flange $t^3$ and a flat ring $t^4$, which are riveted or screwed together. The flange $t^3$ has on its upper and lower edges, respectively, an inwardly-turned lip $u$ and two outwardly-extending lips $v$, that are bent or shaped to form ways in which frictionally fits an apertured slide-plate $w$, that may be slid edgewise when sufficient pressure is exerted upon it. This slide carries the eyepiece $x$.

To the upper and lower walls of the chamber or countersink in which the collapsing observation devices are mounted and near the sides thereof are pivoted levers $y$, the outwardly-projecting heels or extensions $y'$ of which are connected by coiled springs $z$ with a post or eye 1, located about midway of the width of the chamber. The outer ends of these levers are pivoted to links 2, and beyond the pivotal connections the ends of the levers $y$ have turned-over lips 3, that embrace the edges of the links 2, whose outer ends are pivotally attached to the ears or lugs $u$ on the flanges of the eyeglass-holders secured in the ends of the tubular extensions $s$ of the bellows.

A ring 4 may be attached to the bellows between the two tubular extensions thereof. When the bellows is collapsed, the eyepieces lie within the countersink or chamber, the open face of which may be closed by a door 5, provided with a suitable latch. When the door is open and a strain is applied on the ring 4, the bellows is drawn outwardly, as shown in Figs. 1 and 4, until the levers $y$ and links $x$ are drawn to such position that the pivotal connection between them passes beyond a straight line connecting the points on which they rock, when the bellows will be held extended, as shown in Fig. 4. To collapse the bellows, it is only necessary to flex the opposite levers and links toward each other, when the bellows and eyepieces may be collapsed within the chamber or countersink, as indicated in Fig. 5, the tensions of the springs $z$ acting to hold the bellows closed for the reason that the points of connection between the heels of the levers $y$ and spring $z$ have by the collapsed movement been carried to the other side or rearwardly of the pivots on which the levers $y$ turn.

The eyepieces being movable toward and from each other may readily be adjusted to suit the distance between the eyes of the user. By removing the eyepiece-slides the glasses may be removed for cleaning. The eyepieces $x$ flare outwardly, and their edges are shaped to conform generally to the contour of the face and in special cases may be made to exactly conform to the face. To further assist in excluding light, the edge may be faced with velvet, plush, or other yielding material or substance serving a like purpose.

In Figs. 7 and 8 the construction and arrangement of the collapsing bellows are the same as that described except that at its outer or rear end it is not branched, as in Fig. 4, but, on the contrary, to its outer end is attached an eyepiece or shield conforming to the face of the operator and including both eyes, it being somewhat similar to that used in the ordinary stereopticon and each half of which may be said to be an eyepiece. In any case the glasses may be adapted to the eyes of persons of defective vision, and in all cases they serve to exclude dust from the interior of the camera. In Fig. 10 a single large dust-excluding glass 6 is shown.

I claim as my invention—

1. In a photographic camera, the combination of the camera-box containing a focal-plane shutter, a surface on which the image to be photographed may be focused and a mirror in which the focused image is reflected and having in its rear wall a countersink or chamber, and a flexible collapsible structure mounted in said chamber around an opening therefrom into the camera-box and through which and said opening the focused image may be viewed.

2. A photographic camera having observation devices for viewing the image focused on a surface within the camera-box, comprising the combination of a collapsible bellows made of flexible material having eyepieces, means whereby the eyepieces may be adjusted toward and from each other and means for holding the collapsible structure extended or collapsed.

3. A photographic camera having observation devices for viewing the image focused on a surface within the camera-box, comprising the combination of a flexible collapsible structure or bellows, eyepieces whose outer edges are shaped to conform to the contour of the face of the user and means for adjusting the eyepieces toward and from each other.

4. In a photographic camera, the combination of the camera-box containing a surface on which the image to be photographed may be focused, a mirror in which the focused image is reflected, and a focal-plane shutter, and having in its rear wall above the upper shutter-roll a countersink or chamber, a collapsible hood or structure secured around the opening in the bottom of said chamber, eyepieces carried by the outer end of the collapsible structure, and means for permitting the extension or collapsing thereof and holding the same in either extended or collapsed position.

5. In a photographic camera, the combination of the camera-box containing a surface on which the image to be photographed is focused, and a mirror in which the focused image is reflected, and a focal-plane shutter, and having in its rear wall above the upper shutter-roll a countersink or chamber, a collapsing structure of flexible material secured around the opening in the inner wall or bottom of said chamber and branched at its outer end into two parts, eyepieces applied to the open ends of said branches and means whereby said structure may be extended, or collapsed within said chamber.

6. A photographic camera, having observation devices for viewing the image focused on a surface within the camera-box, comprising the combination of a structure or bellows of flexible material secured around the observation-aperture in the wall of the camera, eyepieces applied at its outer end, the pivoted levers $y$, $y$, links 2, 2 and springs $z$, $z$.

7. A photographic camera having observation devices for viewing the image focused on a surface within the camera-box, comprising the combination of a collapsible structure or bellows of flexible material secured around the observation-opening in the wall of the camera and branched at its outer end into two parts, glass-holders mounted in the open ends of said parts, and eyepieces mounted to be adjusted laterally on the glass-holders.

8. A photographic camera having observation devices for viewing the image focused on a surface within the camera-box, comprising the combination of a collapsible structure or bellows of flexible material secured around the observation-opening in the wall of the camera and branched at its outer end into two parts, glass-holders mounted in the open ends of said parts, and eyepieces shaped to conform to the contour of the face of the user and mounted to be adjusted laterally on the glass-holders.

9. A photographic camera having observation devices for viewing the image focused on a surface within the camera-box, comprising the combination of a collapsible structure secured around the observation-opening in the wall of the camera and branched at its outer end into two parts eyepieces applied at the open ends of said parts and having edges shaped to conform to the contour of the face of the user and a facing of yielding substance or material such as plush applied to said edges.

10. A photographic camera having observation devices for viewing the image focused on a surface within the camera-box, comprising the combination of a flexible collapsible structure applied around the observation-opening in the wall of the camera and branched at its outer end into two parts, flanged glass-holders secured in the open ends of such branches, eyepiece-plates slidably mounted on the glass-holders, and flaring eyepieces carried by said plates and shaped to conform to the contour of the face of the user.

In testimony whereof I have hereunto subscribed my name.

LOUIS BORSUM.

Witnesses:
   KATHARINE MACMAHON,
   WILLIAM A. STAHLIN.